(12) United States Patent
Kabishcher et al.

(10) Patent No.: US 12,067,246 B2
(45) Date of Patent: Aug. 20, 2024

(54) DATA STORAGE SYSTEM WITH DYNAMIC WORKLOAD ADJUSTMENT BASED ON HEADROOM ESTIMATION

(71) Applicant: Dell Products L.P., Round Rock, TX (US)

(72) Inventors: Aleksey Kabishcher, Marlborough, MA (US); Vladimir Shveidel, Pardes-Hana (IL); Gajanan S. Natu, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 17/967,240

(22) Filed: Oct. 17, 2022

(65) Prior Publication Data

US 2024/0126442 A1    Apr. 18, 2024

(51) Int. Cl.
*G06F 3/06* (2006.01)

(52) U.S. Cl.
CPC .......... *G06F 3/0613* (2013.01); *G06F 3/0631* (2013.01); *G06F 3/0635* (2013.01); *G06F 3/0683* (2013.01)

(58) Field of Classification Search
None
See application file for complete search history.

(56) References Cited

U.S. PATENT DOCUMENTS

| | | |
|---|---|---|
| 7,669,029 B1 | 2/2010 | Mishra et al. |
| 7,681,054 B2 | 3/2010 | Ghiasi et al. |
| 9,230,121 B1 | 1/2016 | Kelley et al. |
| 9,477,431 B1 | 10/2016 | Chen et al. |
| 9,971,548 B1 * | 5/2018 | Talwar .................. G06F 3/0613 |
| 10,049,116 B1 | 8/2018 | Bajpai et al. |
| 10,992,532 B1 * | 4/2021 | Smith ................. H04L 67/1097 |
| 11,231,966 B2 | 1/2022 | Dorsey et al. |
| 11,429,500 B2 | 8/2022 | Goa et al. |
| 2014/0244598 A1 | 8/2014 | Haustein et al. |
| 2017/0351453 A1 | 12/2017 | Malladi et al. |
| 2019/0129779 A1 * | 5/2019 | Adamson ............ G06F 11/3466 |
| 2019/0212935 A1 * | 7/2019 | Egbert .................. G06F 3/0641 |
| 2020/0192708 A1 * | 6/2020 | Wu ........................ G06F 16/285 |
| 2021/0034577 A1 | 2/2021 | Faibish et al. |
| 2021/0271397 A1 | 9/2021 | Wu et al. |
| 2021/0397357 A1 * | 12/2021 | Azuma ................. G06F 3/0607 |
| 2023/0251785 A1 * | 8/2023 | Dutta ..................... G06F 3/067 711/173 |

* cited by examiner

*Primary Examiner* — Edward J Dudek, Jr.
*Assistant Examiner* — Ralph A Verderamo, III
(74) *Attorney, Agent, or Firm* — BainwoodHuang

(57) ABSTRACT

A method of dynamically adjusting workload of a data storage system includes, while processing a first workload, calculating a saturation value of a saturation metric that scales substantially linearly with an I/O per second (IOPS) rate relative to a maximum IOPS rate of the system, determining that the saturation value is one of (1) above a high threshold and (2) below a low threshold, and performing a workload adjustment operation that establishes a second workload by (1) subtracting from the first workload based on the saturation value being above the high threshold, and (2) adding to the first workload based on the saturation value being below the low threshold, then subsequently processing the second workload.

20 Claims, 3 Drawing Sheets

DATA STORAGE SYSTEM WITH DYNAMIC WORKLOAD ADJUSTMENT BASED ON HEADROOM ESTIMATION

BACKGROUND

The invention relates to the field of data storage, and in particular to techniques for estimating unused processing capacity ("headroom") for use in dynamically adjusting workload and/or other uses.

SUMMARY

A method of dynamically adjusting workload of a data storage system includes, while the data storage system processes a first workload, calculating a saturation value of a saturation metric that scales substantially linearly with an IOPS rate relative to a maximum IOPS rate, where the IOPS rate is a rate of input/output operations of the first workload, and the maximum IOPS rate is a maximum rate of input/output operations that can be handled by the data storage system. The method further includes determining that the saturation value is one of (1) above a high threshold and (2) below a low threshold, and performing a workload adjustment operation based on the determining. The workload adjustment operation establishes a second workload by (1) subtracting from the first workload based on the saturation value being above the high threshold, and (2) adding to the first workload based on the saturation value being below the low threshold. The data storage system then subsequently processes the second workload. In one embodiment the saturation metric applies additional processing to a mode-switching metric used in a separate process of switching operating modes of the data storage system, and the metrics are calculated in part based on a pattern of allocation of processing cores among different types of processing tasks in the data storage system.

BRIEF DESCRIPTION OF THE DRAWINGS

The foregoing and other objects, features and advantages will be apparent from the following description of embodiments of the invention, as illustrated in the accompanying drawings in which like reference characters refer to the same parts throughout the different views.

DETAILED DESCRIPTION

Overview

In the operation of data storage systems, it can be helpful to have estimates of so-called "headroom," i.e., remaining capacity for absorbing additional workload. Although there may be different ways of defining headroom, in this description headroom is described as a remaining portion of a maximum rate of processing of I/O operations, denoted herein as "I/O operations per second" or IOPS. At any given time, a data storage system has a current IOPS for its present workload, and a maximum IOPS that it can handle; the different between these is the headroom. Once headroom is known, it can be used in a variety of ways. It finds particular use in the dynamic adjustment of workload to maximize efficient utilization, improve performance, etc. As an example, in a cluster setting, if one data storage system is operating near its max IOPS while another has some amount of headroom, storage objects (e.g., volumes) can be moved from the maxed-out system to the other system. This results in corresponding changes in workload at the two systems, as I/O requests formerly handled by the one system become handled instead by the other system. Other uses of headroom estimates are described below.

In an approach described herein, headroom is estimated based on measured utilization of processing cores (i.e., the separately allocable processing units in a set of modern multi-core processors), particularly in an environment in which cores are allocated for different classes of operations, as described more below. When such a core allocation scheme is used, there may be not readily available or derivable operating parameter that provides a suitably accurate headroom estimate that varies in a desirably linear manner over a large enough range (e.g., from low IOPS to max IOPS). Thus, described herein is a headroom estimation technique based on a "saturation model" that exhibits such desirable accuracy and linearity. Additionally, a disclosed estimation technique is based in part on using a separate derived metric used for a specialized purpose in the data storage system. This metric correlates well with IOPS saturation but only near max IOPS, and thus is not useful for headroom estimation over the desired broader range. The disclosed technique applies model-based additional manipulation of the metric to produce the desired linear measure of headroom.

Description of Embodiments

Figure 1:
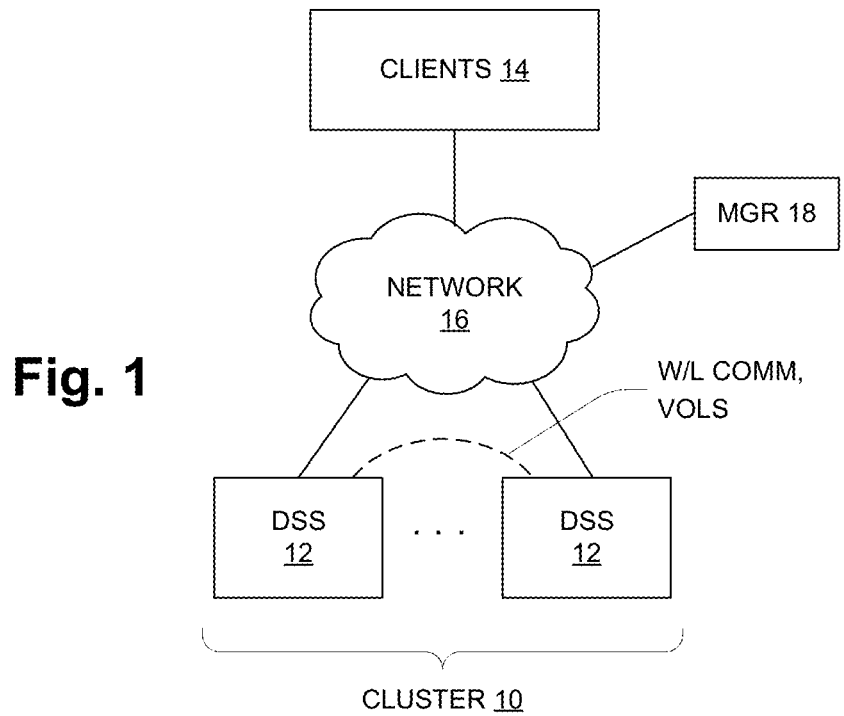
FIG. 1 is a block diagram of a computer system including a cluster of data storage systems.

FIG. 1 shows a computer system that includes a cluster 10 of data storage systems 12, which are coupled to data storage clients 14 (e.g., host computers) by a network 16. The system may also have a separate system manager shown as MGR 18.

In operation, each DSS provides physical storage as well as various logical operations to provide data storage services to the clients 14, as generally known in the art. In particular, the DSSs 12 may provide storage structured as "volumes" having visibility to the clients 14. A volume may be viewed as a logical or virtual representation of a large unit of data storage, analogous to a physical "disk" or "device." Modern data storage systems may host thousands of volumes using extensive underlying physical storage resources such as Flash memory arrays, magnetic media, etc. The clients 14 direct I/O requests to the volumes, and the DSSs 12 are responsible for translating the volume representation to a representation at the physical storage layer of operation, where volume data is physically stored.

In the present description, volumes may be significant insofar as they are the targets of I/O requests that constitute the workload handled by a DSS 12. Just for simple illustration, imagine that a two-DSS system hosts ten volumes overall, with seven on one DSS 12 and three on the other, and that I/O requests are evenly distributed. In this situation, the proportion of the system workload of the two DSSs 12 is 7:3, i.e., one system has a workload 7/3 greater than the other. Thus, the placement of volumes contributes to the distribution of workload. As described more below, the system of FIG. 1 can employ dynamic workload adjustment that may be based on moving volumes among the DSSs 12 of the cluster 10. Such operations are indicated as "workload communication" (W/L COMM) and "volumes" (VOLS) in FIG. 1.

Figure 2:
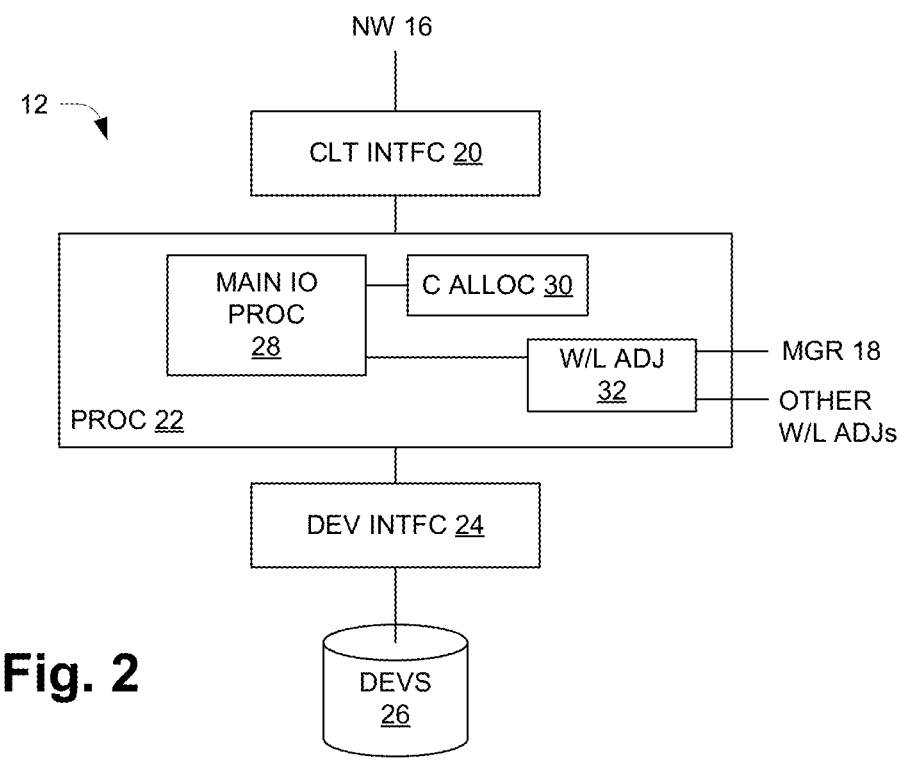
FIG. 2 is a block diagram of a data storage system.

FIG. 2 shows relevant structure and organization of a DSS 12. In includes client interface circuitry (CLT INTFC) 20, processing circuitry (PROC) 22, device interface circuitry (DEV INTFC) 24, and physical storage devices (DEVS) 26. From a hardware perspective, the processing circuitry 22 includes multi-core processors, memory, and I/O interface circuitry and executes specialized data storage software to provide data storage functionality. In the present context, the functional processing is divided into three types as shown: main I/O processing (PROC) 28, core allocation (C ALLOC) 30, and workload adjustment (W/L ADJ) 32. The workload adjustment component 32 has communications connections to the system manager 18 as well as the workload adjustment components of other DSSs 12 of the cluster 10.

The main I/O processing component 28 is responsible for all the client-visible storage functionality such as processing read and write I/O requests. In the present context this functionality may include a service known as "deduplication" that performs various logical manipulations to reduce the storage of redundant data, increasing the efficiency of utilization of physical resources. Deduplication is one example of a type of service for which there may be two distinct operating modes: a foreground or inline mode in which deduplication is performed as data is being written in response to a write request, and a deferred or background mode in which deduplication is performed as a separate process, which can speed up foreground write handling by freeing it of the deduplication task. The presence of deduplication or similar processing is not itself germane to the headroom estimation technique described herein, except that in one embodiment such multi-mode processing can provide an available mode-switching metric that can be further processed into a headroom estimate, as described more below.

Figure 3:
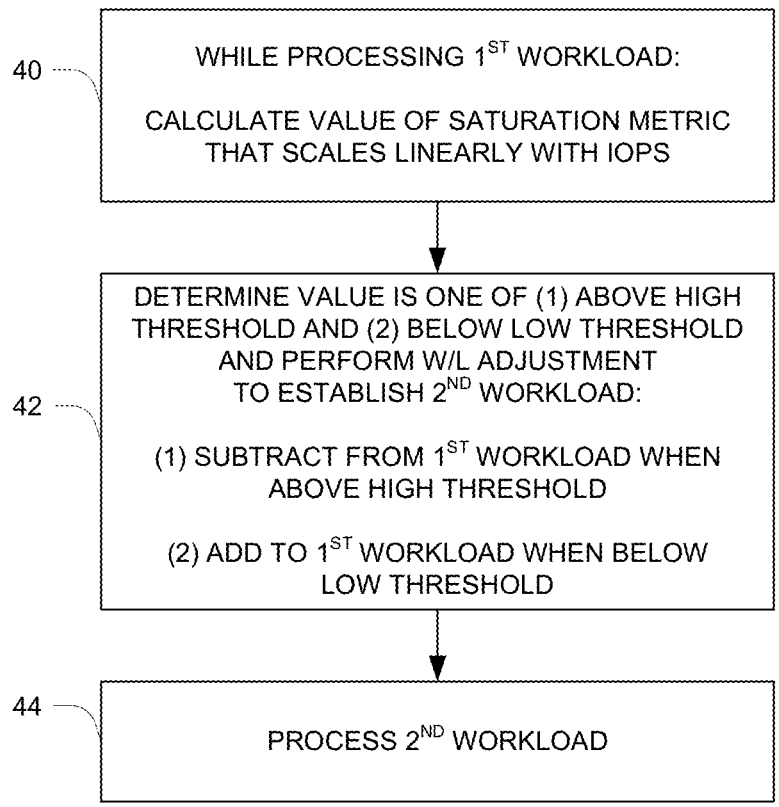
FIG. 3 is a flow diagram of workload-adjustment operation of data storage system.

FIG. 3 shows pertinent operation, which is performed in large part by the components 28-32 of the processing circuitry 22. At 40, while the DSS 12 is processing a first workload, the workload adjustment 32 calculates the value of an IOPS saturation metric that scales linearly with IOPS. This operation is described in detail below. This calculation may be performed at regular intervals or upon occurrence of events at the scale of workload monitoring and adjustment, which may be one the order of once per minute or longer, for example.

At 42, the workload adjustment component 32 determines whether the value of the IOPS saturation metric is above a high threshold or below a low threshold performs a workload adjustment accordingly. If the metric value is above the high threshold, the workload adjustment component 32 may initiate a workload reduction in which workload is subtracted in some manner (e.g., by moving a volume to another DSS 12). Conversely, if the metric value is below the low threshold, the workload adjustment component 32 may initiate a workload increase in which workload is added to in some manner (e.g., by moving a volume to this DSS 12 from another DSS 12). Not explicitly shown at 42 is the no-action case, i.e., when the metric value is between the two thresholds. In this case the best action may be to leave the workload as it is.

At 44, the DSS 12 processes the new $2^{nd}$ workload as established by whatever action was taken at 42 (i.e., increased, decreased, or no action).

In addition to the workload adjustment at 42, the DSS 12 preferably generates an operational indication of the saturation metric and its relationship to the thresholds. The numeric value may be provided to a console or similar user interface tool of the system manager 18, which then can generate a corresponding graphical indication such as a percentage gauge, temperature gauge, etc. For the workload adjustment, moving a storage volume is performed in either a fully automated or semi-automated manner. In full automation, the volume move is performed entirely by the workload adjustment component 34 of the data storage system 12 in cooperation with a workload adjustment component 34 of another data storage system 12 of the cluster 10, while preferably providing status information to the system manager 18 as needed. Semi-automated operation would involve some level of user input from the system manager 18 but utilize automated functions of the workload adjustment component 34. For example, a user may make the decision to move a volume and then issue instructions to source and target DSSs 12 to attend to the volume moving, at which point the workload adjustment components 34 can co-operate to move the volume from one DSS 12 to the other.

Before the IOPS saturation model and saturation metric are described, certain useful background information is provided regarding core allocation and mode switching.

1. Core Allocation and Relation to IOPS Saturation

Figure 4:
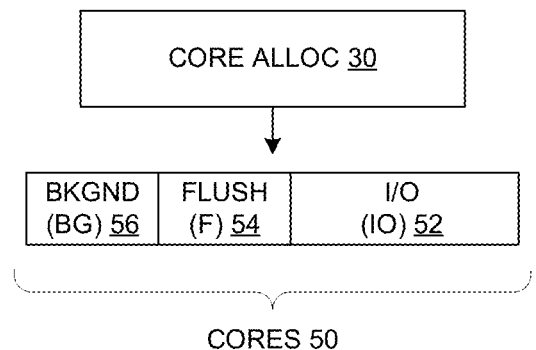
FIG. 4 is a schematic depiction of a scheme for allocating processing cores to different task types in a data storage system.

FIG. 4 illustrates operation of the core allocation component 30. This component typically runs as a background process that responds to operating conditions to vary the allocation of the cores 50 among three classes of operations:
 1. I/O (IO) cores 52: Foreground processing of read/write I/O requests
 2. Flush (F) cores 54: Flushing buffered/cached write data to backend storage devices
 3. Background (BG) cores 56: Perform various mandatory and optional background operations such as file system maintenance operations, garbage collection, snapshots, etc.

The IOPS saturation model herein is related to the CPU core allocation and usage functionality. CPU cores 50 are used for processing read/write IOs (IO cores 52), flushing write IOs from buffer to backend storage devices (flush cores 54) and performing various mandatory and optional background operations such as file system maintenance, garbage collection, snapshots, etc. (BG cores 56). A DSS uses core allocation 30 to dynamically allocate the cores 50 for these three uses depending upon operating conditions such as number of IOPS, IO size, IO type (read or write), accumulated BG debt, etc. In general, it is desirable to allocate as many cores 50 to function as IO cores 52 as possible, for best foreground performance. However, this must be balanced against the needs for buffer flushing and background operations. As those needs grow, more cores may be allocated to those functions, then reallocated as IO cores 52 when those needs have shrunk back to lower levels.

For read IO, IO core utilization increases linearly with workload, because flush and BG cores 54, 56 are not used for processing read IO. Estimating IO core utilization for write IO is more complex, because writes involve interaction between the write buffer and the varying pattern of core allocation. In some system environments, the number of flush cores 54 tends to scale linearly at low load levels (i.e., regular inline operation 60) and non-linearly at high load levels (during deferred operation 64). Additionally, the number of BG cores 56 tends to scale non-linearly regardless of the load level. This implies that utilization of IO cores 52 scales non-linearly especially for write-heavy workloads (since writes utilize both flush and BG cores 54, 56). This observation is consistent with observations of non-linear variation of mode-switching metric (M) with IOPS saturation for write workloads. Thus, to establish a correlation between IO core utilization and load saturation, a model based on BG and flush core scaling function needs to be developed.

Mode-Switching and M Metric

Figure 5:
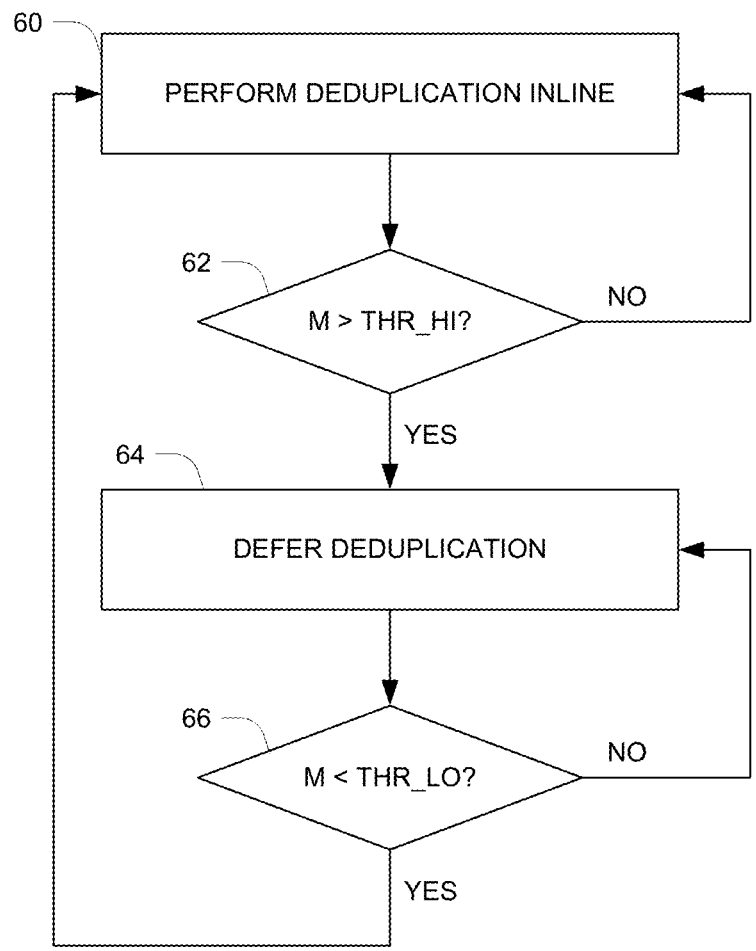
FIG. 5 is a flow diagram of technique for handling deduplication processing in response to workload conditions in a data storage system.

FIG. 5 illustrates mode-shifting that occurs for deduplication processing, as briefly mentioned above. This operation employs a mode-shift metric M that is based on operating parameters as described below.

At 60, the system is operating in a regular mode in which deduplication is performed inline, i.e., in conjunction with each write operation storing new data. Inline operation is preferred for reasons of efficiency, but it also increases the latency of each individual write operation. At regular intervals (e.g., once per second), at 62 the value M is evaluated and compared to a high threshold (THR_HI). If M is below this threshold, then inline operation continues at 60. If M is above this threshold, then operation switches to a mode providing higher short-term throughput, to keep up with a high instantaneous IOPS rate such as may occur when a DSS 12 receives a long fast burst of writes. This mode is represented as deferred deduplication at 64. In this mode, writes are processed as they are received, and deduplication is deferred until later in a separate background process. Again at regular intervals, at 66 the value M is evaluated and compared to a low threshold (THR_LO). If M is below this threshold, then deferred deduplication continues at 64. Otherwise, inline operation resumes at 60.

The thresholds in the process of FIG. 5 are distinct from those used in the process of FIG. 3, which are described more below. It is generally advisable to use separate high and low thresholds to provide hysteresis and reduce any short-term "stuttering" in which the operating mode rapidly switches back and forth. Nonetheless, in some embodiments the high and low threshold THR_HI and THR_LO may be the same single threshold value.

The mode-switching metric M is an artificial metric calculated as a linear combination of normalized read/write IOPS and read/write bandwidth per IO core cycle (i.e., instruction processing cycle). When the value of M exceeds the high threshold THR_HI, it indicates the system has reached saturation point (max possible IOPS) for that mode. Thus, M can be seen as a function that correlates utilization of IO cores 52 (flush and BG cores excluded) with workload saturation.

M is generally invariant of workload and platform type, and it correlates well with system saturation when it is "near saturation" point, so it provides for efficiently switch between normal and deferred modes 60, 64. However, directly applying M to extrapolate max possible IOPS starting from given M and IOPS values (i.e., for estimating system headroom) is not possible, because M does not vary linearly for all workloads across an larger load range (0 to 100%).

Specifically, benchmark tests have indicated the following:

M varies linearly with IOPS saturation for read workloads.

M vs. IOPS saturation variation is non-linear for write workloads

At load saturation (max IOPS), the M value is >95% as expected for all tested workload When a system is not at max IOPS, M does not grow linearly or predictably with increasing IOPS for write workloads.

As noted above, it is believed that the non-linearity of M is due to the non-linear scaling of the number of flush cores and background cores 54, 56 with IOPS. Thus, to correlate IO core saturation with IOPS saturation (headroom), a new approach and new metric are defined, as described more fully below. This definition involves use of a saturation model and a definition for a saturation metric that linearly correlates with IOPS saturation.

Saturation Model

A model is developed to represent IO core saturation as explained below.

Assumptions:
1. Under steady state, flush cores write bandwidth (BW) is equal to IO core write BW
2. Flush core scaling is linear with write IO (This is valid at low load levels. Although flush cores scale non-linearly at high workloads, this assumption nonetheless reasonable approximation)
3. BG cores at max load can be estimated (more details below)
4. Sum of Flush cores 54, IO cores 52 and BG cores 56 is always equal to the fixed total number of cores 50

Saturation Model Equations

BW indicates total IO bandwidth (read+write IO)

"_max" indicates that the parameter represents the value at max load

Based on assumptions 1 and 4 above:

Flush Core BW=IO core BW

Flush Core+IO core+BG core=$N$ total cores

Note that the above is valid at any load level.

Define saturation as a ratio of current BW to BW at max load:

$$\text{saturation} = \frac{BW}{BW_{max}}$$

Current BW is known. The max BW of system can be calculated as follows.

Using assumption 1, $BW_{max}$=Flush Core $BW_{max}$=IO core $BW_{max}$

IO core $BW_{max}$=max BW per IO core*IO core$_{max}$, where IO core$_{max}$ is IO cores at max load Using one definition of M, the maximum supported BW by each IO core in terms of M is given by:

$$\max BW \text{ per } IO \text{ core} = \frac{BW}{IO \text{ core} * M}$$

IO core BW at max load is given by $$IO \text{ core } BW_{max} = \max BW \text{ per } IO \text{ core} * IO \text{ core}_{max} = \frac{BW * IO \text{ core}_{max}}{IO \text{ core} * M}$$

Similarly, flush core BW at max load is given by, $$\text{Flush Core } BW_{max} = \max BW \text{ per Flush core} * \text{Flush core}_{max}$$

$$\max BW \text{ per Flush core} = \frac{BW}{\text{Flush core}}$$

$$\text{Flush Core } BW_{max} = \max BW_{max} =$$

$$\max BW \text{ per Flush core} * \text{Flush core}_{max} = \frac{BW * \text{Flush core}_{max}}{\text{Flush core}}$$

$$\text{Therefore: } \frac{BW * IO \text{ core}_{max}}{IO \text{ core} * M} = \frac{BW * \text{Flush core}_{max}}{\text{Flush core}}$$

It is also known that:

Flush Core+IO core+BG core=$N$ total cores

So at max load,

Flush Core$_{max}$+IO core$_{max}$+BG core$_{max}$=$N$ total cores $$\frac{BW * IO \text{ core}_{max}}{IO \text{ core} * M} = \frac{BW * (N - BG \text{ core}_{max} - IO \text{ core}_{max})}{N - BG \text{ core} - \text{Flush core}}$$

$$IO \text{ core}_{max} = IO \text{ core} * M * \frac{(N - BG \text{ core}_{max})}{N - BG \text{ core} - IO \text{ core} + IO \text{ core} * M}$$

$$\text{saturation} = \frac{BW}{BW_{max}} = \frac{BW}{IO \text{core } BW_{max}} = \frac{IO \text{ core} * M}{IO \text{ core}_{max}}$$

$$\text{saturation} = \frac{N - BG \text{ core} - IO \text{ core} + IO \text{ core} * M}{N - BG \text{ core}_{max}} =$$

$$\frac{N - BG \text{ core} + (M - 1) * (N - \text{Flush core} - BG \text{ core})}{N - BG \text{ core}_{max}}$$

$$\text{saturation} = \frac{\text{Flush core} + M * (N - \text{Flush core} - BG \text{ core})}{N - BG \text{ core}_{max}}$$

The last step is to use the assumption the max BG cores can be estimated (see below) so the BG value can be changed to its max fixed value $$\text{saturation} = \frac{\text{Flush core} + M * (N - \text{Flush core} - BG \text{ core}_{max})}{N - BG \text{ core}_{max}}$$

The above equation can be also written as:

$$\text{saturation} = \frac{(N - F - BG) * M + F}{N - BG}$$

where
N—Total number of cores 50
F—Number of flush cores 54
BG—Number of BG cores 56 at max load
M—mode-switching metric In the above equation, the term $(N-F-BG)*M$ can be viewed as effective IO core utilization. This value is added to the number of flush cores, and the sum divided by the number of cores used for real-time processing (subtracting BG from N). This is the IOPS saturation value that scales linearly over a broad range of IOPS values.

The above is an equation for fractional IOPS saturation (saturation as a fraction of maximum). Headroom is obtained by subtracting this value from 1:

Storage headroom=1−saturation

Max BG Core Estimation Algorithm

The saturation model explained above depends on BG count at maximum load. Using current BG count or average BG count does not work, because BG at max load value is not reached until the system is at maximum load. As a result, it is necessary to estimate BG at maximum load based on current saturation. The estimation algorithm should be able to:

1) use average over some period time to reduce the impact of noise and random spikes on BG estimation
2) "forget" the $BG_{max}$ in case load pattern changes over time The following algorithm for $BG_{max}$ estimation can be used:

for each stats sample if ($M$>last$_m$ or $M$>THR)

coeff=$M$*Weight $BG_{max}$=(1−coeff)*$BG_{max}$+coeff*BG last$_m$=$M$ last$_m$=(1−LeakyBucket)*last$_m$+LeakyBucket*$M$ Where:
last$_m$ —last biggest saturation
Weight—constant less than 1, enables averaging over some period (including around max load) when calculating $BG_{max}$.
LeakyBucket—constant less than 1, enables "forgetting" old $BG_{max}$ slowly in a time-dependent manner as a load pattern changes
THR—constant less than 1, enables $BG_{max}$ to be updated rapidly when closer to saturation
M—mode-switching metric The parameters THR, Weight, LeakyBucket are constants that can be fine-tuned based on sample rate and system size.

Validation of Saturation Model

The adaptive scaling model described above has been validated for various workloads and load levels. Using IOPS measured during the test and saturation calculated based saturation model, the following quantities were evaluated:

1) Normalized IOPS saturation: Saturation IOPS for a workload is defined as the IOPS level at which the system enters deferred mode 64. Workload IOPS measured during a test are normalized using saturation IOPS to determine normalized IOPS saturation
2) Saturation based on saturation model: For a given load level during a test, saturation was calculated using saturation model as described above.
3) In the context of this comparison, headroom is defined as how far the system is away from saturation. Since all values are normalized, Actual headroom (how far the system is from IOPS saturation)=(1−normalized IOPS saturation)

Estimated headroom (how far the system is from saturation)=(1−saturation obtained from saturation model).

Results for estimated headroom vs actual headroom across different workloads (e.g., OLTP, VSI, VDI, SQL) indicate that the model-based headroom estimation is accurate and has good linear scaling. For example, for actual headroom values of 20%, 40%, 60% and 80% (corresponding to actual IOPS saturations of 80%, 60%, 40% and 20% respectively), the estimated headroom in all cases is within a few percentage points of the actual value.

While various embodiments of the invention have been particularly shown and described, it will be understood by those skilled in the art that various changes in form and details may be made therein without departing from the scope of the invention as defined by the appended claims.

What is claimed is:

1. A method of dynamically adjusting workload of a data storage system, comprising:
while the data storage system processes a first workload, calculating a saturation value of a saturation metric that scales substantially linearly with an IOPS rate relative to a maximum IOPS rate, the IOPS rate being a rate of input/output operations of the first workload, the maximum IOPS rate being a maximum rate of input/output operations that can be handled by the data storage system;
determining that the saturation value is one of (1) above a high threshold and (2) below a low threshold, and performing a workload adjustment operation based on the determining, the workload adjustment operation establishing a second workload by (1) subtracting from the first workload based on the saturation value being above the high threshold, and (2) adding to the first workload based on the saturation value being below the low threshold; and
subsequently processing the second workload.

2. The method according to claim 1, wherein calculating the saturation value of the saturation metric utilizes respective counts of processing cores allocated for different types of operations performed for the first workload.

3. The method according to claim 2, wherein the different types of operations include IO request processing, buffer flushing, and background operations, and the processing cores are allocated as IO cores, flush cores, and background cores respectively.

4. The method according to claim 3, wherein calculating the saturation value of the saturation metric comprises scaling a number of IO cores by a mode-switching metric M produced by a separate mode-switching process that switches between two different types of processing for write operations.

5. The method according to claim 4, wherein the two different types of processing are for data deduplication functionality and include an inline mode and a deferred mode, the inline mode performing deduplication as each write occurs, the deferred mode performing each write without deduplication and deferring the deduplication to a separate background task.

6. The method according to claim 4, wherein the mode-switching metric M is produced as a linear combination of normalized read IOPS, write IOPS, read bandwidth and write bandwidth per IO core cycle.

7. The method according to claim 4, wherein the saturation metric is equal to $((N-F-BG)*M+F)/(N-BG)$, wherein N is a total number of cores, F is a number of flush cores, BG is a number of background cores at maximum load, and M is the mode-switching metric.

8. The method according to claim 7, wherein BG is estimated in a manner that 1) uses an average over some time period to reduce impact of noise and random spikes on BG estimation, and 2) enables the estimate of BG to track changes in load pattern over time.

9. The method according to claim 1, wherein subtracting from the first workload comprises moving a storage volume from the data storage system to another data storage system and wherein adding to the first workload comprises moving a storage volume to the data storage system from another data storage system.

10. The method according to claim 9, wherein moving a storage volume is performed in either a fully automated or a semi-automated manner, the automated manner being performed by a workload adjustment component of the data storage system in cooperation with a workload adjustment component of another data storage, the semi-automated manner being performed with user input from a separate system manager coupled to the data storage system.

11. A data storage system comprising storage devices, interface circuitry, and processing circuitry, the processing circuitry executing operational software providing data storage functionality including a method of dynamically adjusting workload of the data storage system, the method including:
while the data storage system processes a first workload, calculating a saturation value of a saturation metric that scales substantially linearly with an IOPS rate relative to a maximum IOPS rate, the IOPS rate being a rate of input/output operations of the first workload, the maximum IOPS rate being a maximum rate of input/output operations that can be handled by the data storage system;
determining that the saturation value is one of (1) above a high threshold and (2) below a low threshold, and performing a workload adjustment operation based on the determining, the workload adjustment operation establishing a second workload by (1) subtracting from the first workload based on the saturation value being above the high threshold, and (2) adding to the first workload based on the saturation value being below the low threshold; and
subsequently processing the second workload.

12. The data storage system according to claim 11, wherein calculating the saturation value of the saturation metric utilizes respective counts of processing cores allocated for different types of operations performed for the first workload.

13. The data storage system according to claim 12, wherein the different types of operations include IO request processing, buffer flushing, and background operations, and the processing cores are allocated as IO cores, flush cores, and background cores respectively.

14. The data storage system according to claim 13, wherein calculating the saturation value of the saturation metric comprises scaling a number of IO cores by a mode-switching metric M produced by a separate mode-switching process that switches between two different types of processing for write operations.

15. The data storage system according to claim 14, wherein the two different types of processing are for data deduplication functionality and include an inline mode and a deferred mode, the inline mode performing deduplication as each write occurs, the deferred mode performing each write without deduplication and deferring the deduplication to a separate background task.

16. The data storage system according to claim 14, wherein the mode-switching metric M is produced as a linear combination of normalized read IOPS, write IOPS, read bandwidth and write bandwidth per IO core cycle.

17. The data storage system according to claim 14, wherein the saturation metric is equal to $((N-F-BG)*M+F)/(N-BG)$, wherein N is a total number of cores, F is a number of flush cores, BG is a number of background cores at maximum load, and M is the mode-switching metric.

18. The data storage system according to claim 17, wherein BG is estimated in a manner that 1) uses an average over some time period to reduce impact of noise and random spikes on BG estimation, and 2) enables the estimate of BG to track changes in load pattern over time.

19. The data storage system according to claim 11, wherein subtracting from the first workload comprises moving a storage volume from the data storage system to another data storage system and wherein adding to the first workload comprises moving a storage volume to the data storage system from another data storage system.

20. The data storage system according to claim 19, wherein moving a storage volume is performed in either a fully automated or semi-automated manner, the automated manner being performed by a workload adjustment component of the data storage system in cooperation with a workload adjustment component of another data storage, the semi-automated manner being performed with user input from a separate system manager coupled to the data storage system.

* * * * *